(12) United States Patent
Schoenmakers et al.

(10) Patent No.: US 9,740,973 B2
(45) Date of Patent: Aug. 22, 2017

(54) METHOD FOR STOPPING A PRINT SYSTEM

(71) Applicant: Oce-Technologies B.V., Venlo (NL)

(72) Inventors: Erik J. W. Schoenmakers, Venlo (NL); Rob J. E. Looijmans, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/297,465

(22) Filed: Oct. 19, 2016

(65) Prior Publication Data

US 2017/0124437 A1 May 4, 2017

(30) Foreign Application Priority Data

Nov. 3, 2015 (EP) .................................... 15192775

(51) Int. Cl.

| G06K 15/00 | (2006.01) |
|---|---|
| B41J 13/00 | (2006.01) |
| B41J 2/01 | (2006.01) |
| B41J 29/387 | (2006.01) |
| G03G 15/00 | (2006.01) |

(52) U.S. Cl.
CPC ............ *G06K 15/4085* (2013.01); *B41J 2/01* (2013.01); *B41J 13/0018* (2013.01); *B41J 29/387* (2013.01); *G03G 15/50* (2013.01); *G06K 15/404* (2013.01); *G06K 15/4065* (2013.01)

(58) Field of Classification Search
None
See application file for complete search history.

(56) References Cited

U.S. PATENT DOCUMENTS

| 8,985,729 B1 | 3/2015 | Able et al. | |
|---|---|---|---|
| 2014/0153937 A1 | 6/2014 | Unno | |
| 2014/0240741 A1* | 8/2014 | Ogawa | G06F 3/1264 358/1.13 |
| 2015/0294201 A1* | 10/2015 | Takahashi | G06F 3/1208 358/1.14 |
| 2015/0338810 A1* | 11/2015 | Matsui | G03G 15/652 399/16 |
| 2017/0113891 A1* | 4/2017 | Middleton | B65H 7/02 |

* cited by examiner

*Primary Examiner* — Fan Zhang
(74) *Attorney, Agent, or Firm* — Birch, Stewart, Kolasch & Birch, LLP

(57) ABSTRACT

A method and print system for stopping the print system are disclosed. The print system includes a control unit for controlling the printing of sheets, a print engine for printing recording material on the sheets, an input tray for holding sheets to be printed upon, and a finishing unit. The method includes scheduling printing and finishing of a plurality of sheets, including sending a sheet request from the control unit to the finishing unit, and upon receiving the sheet request, the finishing unit provides an earliest expected arrival time of a sheet at the finishing unit to the control unit. When this time is too huge, operator intervention is required and the finishing unit reports an error to the control unit, after a previous sheet has been deposited in the finishing unit, and the control units stops the print engine before the sheet leaves the input tray.

12 Claims, 5 Drawing Sheets

METHOD FOR STOPPING A PRINT SYSTEM

CROSS-REFERENCE TO RELATED APPLICATIONS

This application claims priority under 35 U.S.C. §119(a) to Application No. 15192775.3, filed in Europe on Nov. 3, 2015, the entire contents of which is hereby incorporated by reference into the present application.

BACKGROUND OF THE INVENTION

1. Field of the Invention

The present invention relates to a method for stopping a print system from printing, the print system comprises a control unit for controlling the printing of sheets, a print engine for printing recording material on the sheets, an input tray for holding sheets to be printed upon, and a finishing unit. The method comprising the steps of scheduling a plurality of sheets for printing by the print engine and for finishing by the finishing unit, the scheduling step comprising, for each sheet of the plurality of sheets, sending a sheet request for the sheet from the control unit to the finishing unit, and upon receiving the sheet request, the finishing unit submits to the control unit an earliest expected arrival time of the sheet at the finishing unit, the earliest expected arrival time is a minimum delay time between the sheet and a previous sheet preceding the sheet.

A finishing unit is any unit positioned at an outlet of the print engine for printed media.

A finishing unit may be a stapler, a stacker, a perforator, a binder, a packager, a sealer, a folder, a stitcher, a varnisher, a laminator, a embosser, an stripper, a collator, a puncher, or any other finishing or paper handling device, or any combination of the foregoing.

2. Description of the Background Art

In the print system a sheet is transferred from an input tray through the print engine to a finishing unit. The trajectory from input tray to the finishing unit is also known as the paper path of the print system. When an error occurs in the finishing unit or in the paper path, the error will be notified to the control unit of the print system for example by sensors in the print system. The control unit will stop the print engine and sheets which are at that moment somewhere in the paper path have to be removed by a manual time-consuming action of the operator.

Sometimes operator actions are required in case of a local action request from the finishing unit, or to manually adjust parts of the finishing unit due to sheet specifications, or to manually unload a full stacker of sheets. If such operator actions are not scheduled, a paper jam may occur in the finishing unit and/or in the paper path.

The object of the invention is to provide a method that can stop the print engine without having to remove sheets from the paper path. Another object is to provide a print system in which the method is implemented.

SUMMARY OF THE INVENTION

For this purpose, an earliest expected arrival time to the finishing unit for a particular sheet of the plurality of sheets, which particular sheet has not been separated from the input tray, is a minimum time delay between the particular sheet and a previous sheet preceding the sheet, wherein the minimum time delay is larger than a travel time of the previous sheet from the input tray to the finishing unit. The method comprises the steps of submitting a notification by the finishing unit to the control unit, after the previous sheet has been deposited in the finishing unit, the notification comprising a stop request by reporting an error on the particular sheet to the print system, which error normally leads to a print engine stop, and stopping the print engine by the control unit before the particular sheet is separated from the input tray.

By doing so, the paper path of the print system will be empty since the previous sheet, and possible sheets before the previous sheet, are already received by the finishing unit. This is advantageous since the operator does not have to get sheets out of the paper path of the print system. There is time left before the print system is going to print the particular sheet, because of the huge earliest expected arrival time of the particular sheet and the submitted notification, which leads to a print engine stop before the particular sheet has left the input tray. Therefore the paper path will stay empty.

The notification may be called artificial, since no error has occurred, as the particular sheet has not even been separated from the input tray. In order to prevent an error leading to a stop of the print engine, like a paper jam, the finishing unit submits a signal indicating the earliest expected arrival time for the particular sheet, and whether an operator action is needed on the finishing unit before the particular sheet arrives at the finishing unit, or even before the particular sheet is separated from the input tray.

According to an embodiment, the previous sheet is a last scheduled sheet in a print queue buffer of the control unit. When sheets are scheduled in the print queue buffer of the control unit of the print system, those sheets may be printed by the print engine and arrive at the finishing unit before the print engine is stopped, as a result of the notification. Therefore the gap in time between separation of the previous sheet preceding the particular sheet from the input tray and the separation of the particular sheet from the input tray is taken into account, before the particular sheet is going to be separated from the input tray. By doing so, the print queue buffer, i.e. the sheets scheduled in the print queue buffer of the control unit are printed and processed by the finishing unit, becomes empty, and no sheet will be present in the paper path before the particular sheet is separated from the input tray.

According to an embodiment, the submitted earliest expected arrival time is a maximum time to be defined in the memory of the finishing unit. For example, if the value for the earliest expected arrival time is defined in the memory of the finishing unit as 32 bits and in milliseconds, the maximum time is 4294967296 milliseconds, which approximately equals 50 days. Due to this unrealistic high duration of 50 days, the print engine will stop scheduling any new sheets while the print engine keeps processing and sending the sheets, which are already scheduled in the print queue buffer of the control unit.

According to an embodiment, the notification comprises a desired operator action and a location of the print system, at which the desired operator action should be applied, and the method comprises the step of displaying the notification on a user interface of the print system. The desired operator action may also be displayed at a possibly present user interface of the finishing unit. According to an alternative embodiment, the notification comprises an engine information item, for example an error code. The engine information item is known beforehand to the control unit of the print system. The engine information item can be decoded by the control unit into an appropriate instruction for the operator. The appropriate instruction can be shown at the user interface of the print system. The appropriate instruction may comprise an instruction to clear the stop request in the finishing unit. Clearance of the stop request may be effectuated by pressing a user operable digital item—like a green button—on an external tracking system at the user interface of the print system, or at a possible user interface of the finishing unit.

According to an embodiment, the finishing unit comprises a detection module for detecting a need for the desired operator action. For example, if the finishing unit is a stacker system for printed sheets, which is coupled to a finisher obtained from an original equipment manufacturer, i.e. an OEM finisher, the stacker system may comprise a detection module for deriving from the print specifications for the sheets that an operator action for the sheets is needed at the OEM finisher. The stacker system applies the method according to the invention and a soft stop of the print system is introduced. This is advantageous, since by applying the method in this manner, an earliest possible moment in time is enforced for clearing the reason of the stop request.

According to an embodiment, the detection module is a camera system for detecting a stop request for the sheets to be separated from the input tray. Sheets arriving at the finishing unit may comprise a content error or a media error. A content error may be an erroneous—not-readable or doubled or missing or out-of-output-category—printed object on the sheet, for example a bar code, QR code, scan code, etc. A media error may be that an unspecified media type is used, the sheets are wrongly inserted in the input tray, the orientation of the printed sheets when arriving at the finishing unit is not correct, pre-printed media should have been used instead of normal media, etc. In this way, an extra check on the wanted output of the print system is introduced.

According to an embodiment, the detection module is part of a local user interface of the finishing unit, which is configured to receive a finishing unit user request to stop printing. The operator may visually or aurally detect an error and is able to pass this error to the finishing unit by the local user interface of the finishing unit.

According to an embodiment, the error is a foreseen paper jam caused by the particular sheet. Physically, it is impossible that the particular sheet caused a paper jam, since the particular sheet has not even been separated from the input tray. However, due to such a severe error as a foreseen paper jam, the control unit will at least—as soon as possible—stop the print engine.

The present invention also relates to a print system comprising a control unit for controlling the printing of sheets, a print engine for actually printing recording material on the sheets, an input tray for holding sheets to be printed upon, and a finishing unit, wherein the control unit is configured to execute the step of sending a sheet request to the finishing unit and the step of stopping the print engine and the finishing unit is configured to execute the other steps of the method according to the invention.

According to an embodiment of the print system, the finishing unit comprises a high-level integrated unit connected to the control unit of the print system, and a low-level integrated unit connected to the high-level integrated unit, wherein the control unit of the print system controls the high-level integrated unit, and the high-level integrated unit is configured to receive signals from the low-level integrated unit in case of an error on a sheet of the plurality of sheets, which error is detected by the low-level integrated unit.

According to an embodiment of the print system, the finishing unit comprises a high-level integrated unit connected to the control unit of the print system, and a low-level integrated unit connected to the high-level integrated unit, wherein the control unit of the print system controls the high-level integrated unit and the high-level integrated unit is configured to predict a future error in the low-level integrated unit by the print specifications of the plurality of sheets.

The present invention further relates to a non-transitory computer readable medium comprising computer executable program code configured to instruct a computer to perform a method according to the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
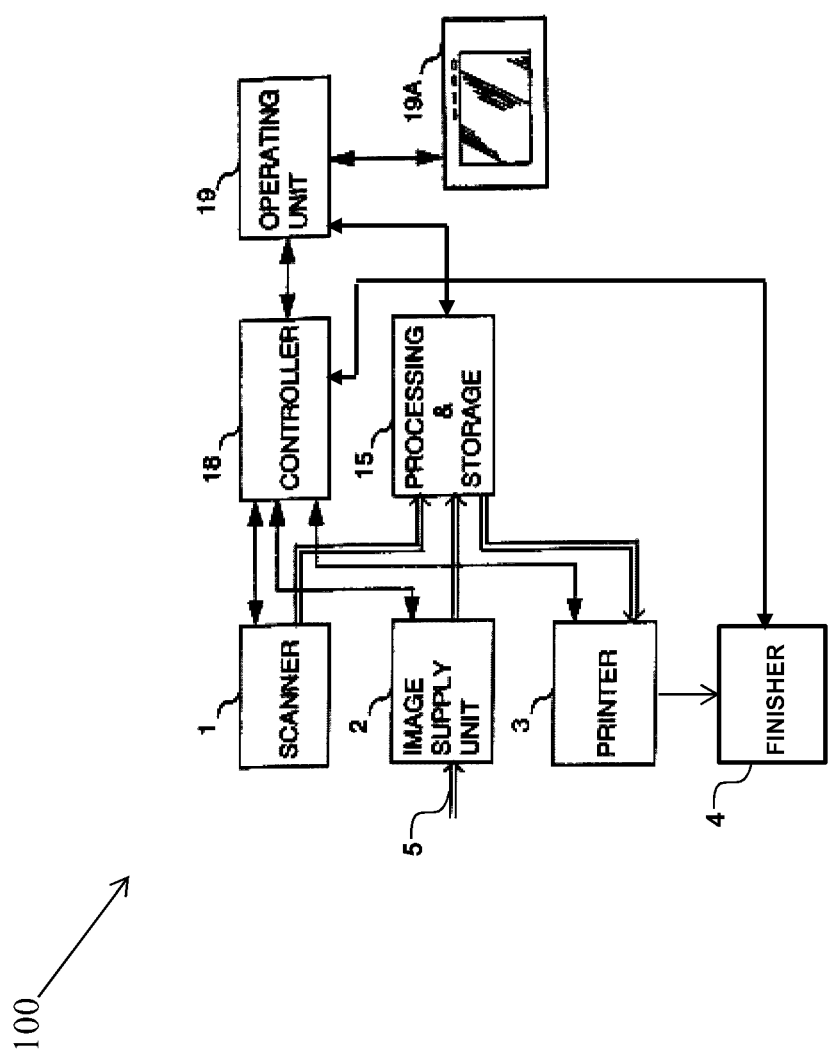
FIG. 1 shows the general arrangement of the print system according to the invention.

The present invention will now be described with reference to the accompanying drawings, wherein the same reference numerals have been used to identify the same or similar elements throughout the several views.

FIG. 1 shows the general arrangement of a print system 100 according to the invention. The print system 100 may be an inkjet print system, an electro-photographical print system, or a 3D objects print system. The print system 100 may comprise a scanner 1 for opto-electrical scanning of a document, and delivering digital image information corresponding thereto. The print system 100 comprises a feeder 2 for feeding image information from an external source 5 to the print system 100, a print engine 3 for printing digital image information on the sheets, and a finishing unit 4 for post-processing the printed sheets. The feeder 2 is configured to receive a print job with a print job ticket, comprising a plurality of print job settings for the sheets to be printed upon. Both the scanner 1 and the feeder unit 2 are connected to a device 15 for processing and intermediate storage of image information, which is in turn connected to the print engine 3. The optional scanner 1, the feeder unit 2, the device 15 and the print engine 3 are connected to a control unit 18, which is also connected to a user interface 19 provided with an operator control panel 19A with operator control elements and a display element, for example an LCD screen in the form of a touch screen, for use by an operator at the print system 100. The operator control panel 19A may be remotely positioned and/or wirelessly connected to the print system 100. The control unit 18 comprises a print queue buffer (not shown) for ordering the sheets of the print jobs, which are submitted to the print system 100 via the feeder 2 or via the scanner 1. The control unit 18 may be integrated near the print engine 3, or may be positioned remotely from the print engine 3. The user interface 19 gathers information from the control unit 18 and the device 15 in order to display the gathered information at the operator control panel 19A. The user interface 19 may also be implemented as a work station, connected to the print system 100 via wired or wireless connection, or as a mobile device, which is wirelessly connected to the print system 100. The control unit 18 comprises storage for a plurality of print system settings. The print system settings determine a pre-printing process, for example a ripping process of a print job, a print process by the print engine 3, and a post-printing process, for example an inline finishing step. The print engine 3 comprises at least one input tray (see FIG. 2) for holding sheets of the print media to be printed by the print engine 3.

The finishing unit 4 comprises a high-level tightly integrated unit, which communicates with the control unit 18 by an integrated finisher protocol. The control unit 18 has knowledge about the capabilities and the constraints of the finishing unit 4.

The finishing unit 4 may comprise a low-level loosely integrated unit. In the latter case, the control unit 18 has no knowledge about the capabilities and the constraints of the finishing unit 4.

Figure 2:
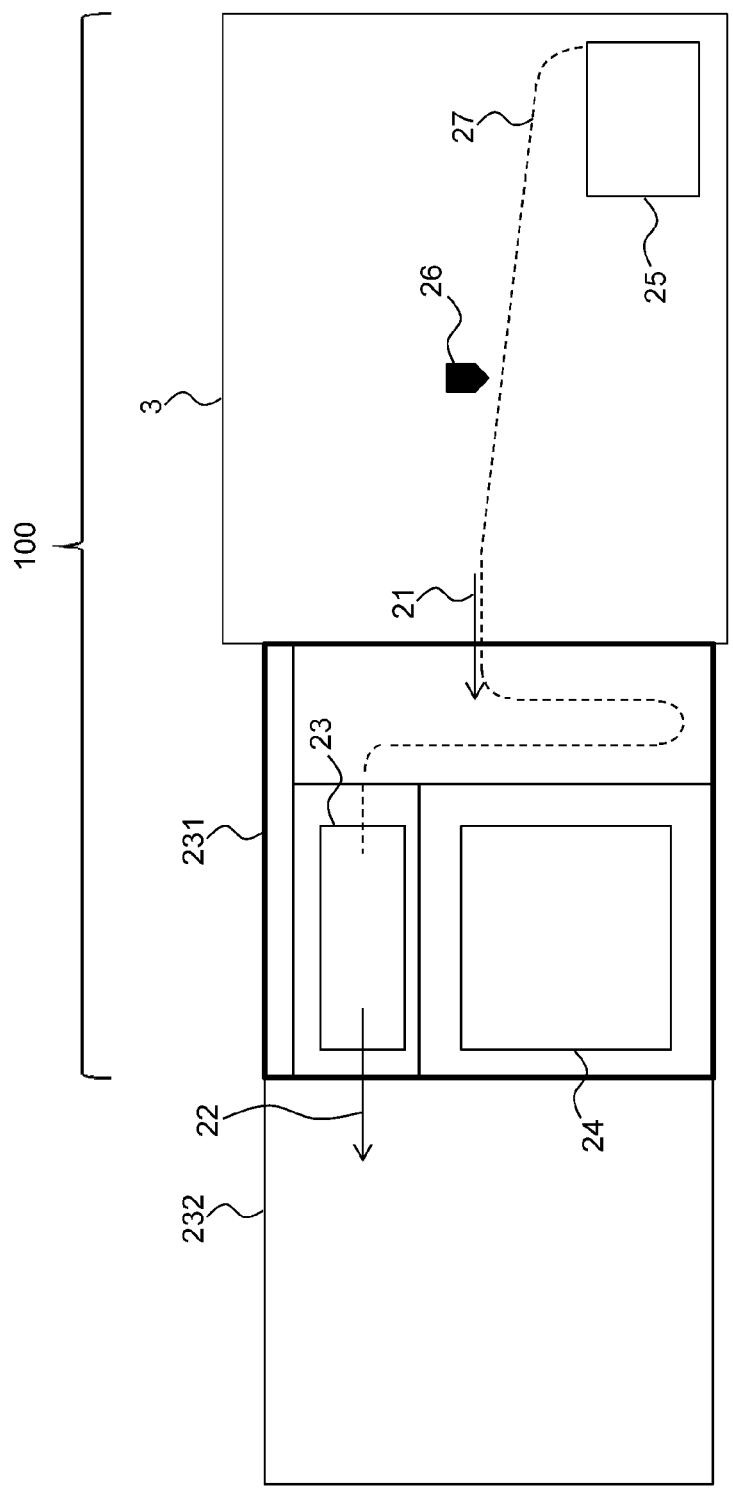
FIG. 2 shows a first example of a print system according to the invention.

FIG. 2 shows another embodiment according to the invention. The finishing unit 4 comprises a high-level integrated unit 231 coupled to a low-level integrated unit 232. The characteristics—features and constraints—of the high-level integrated unit 231 are known to the control unit 18 of the print system 100. The high-level integrated unit 231 is arranged between an outlet 21 of the print engine 3 and an inlet 22 of the low-level integrated unit 232. The low-level integrated unit 232 is controlled by the high-level integrated unit 231 by a low-level interface based on one or more I/O—input and output—communication lines. The characteristics—features and constraints—of the low-level integrated unit 232 are known to the high-level integrated unit 231 as far as necessarily and are not known to the control unit 18 of the print system 100. The print system 100 comprises an input tray 25 for holding media to be printed. Media to be printed and to be finished is led along a paper path 27 from the input tray 25 along a print head or print assembly 26 to the outlet 21.

According to the invention, the high-level integrated unit 231 is capable of determining that an operator action is needed for a particular sheet or beginning at a particular sheet, at the low-level integrated unit 232, because of the sheet specifications received by the high-level integrated unit 231 from the control unit 18 of the print system 100. The high-level integrated unit 231 submits a huge expected earliest arrival time of the particular sheet, and submits a notification for the particular sheet to let the print engine stop after the sheet previous to the particular sheet has been processed by the low-level integrated unit 232.

Such a stop may be necessary due to an operator action on the low-level integrated unit 232. For example, if the low-level integrated unit 232 needs an operator action since the format size of the media is changing, a number of pages of a book is changing, a number of pages for binding is changing, a perforating pattern is changing, etc. The high-level integrated unit 231 may be for example a high capacity stacker with at least one window 23, 24 for looking inside the high capacity stacker. The low-level integrated unit 232 may be for example an OEM finisher obtained from an original equipment manufacturer, for example a book binder, a perforator, sealing device, etc.

Figure 3:
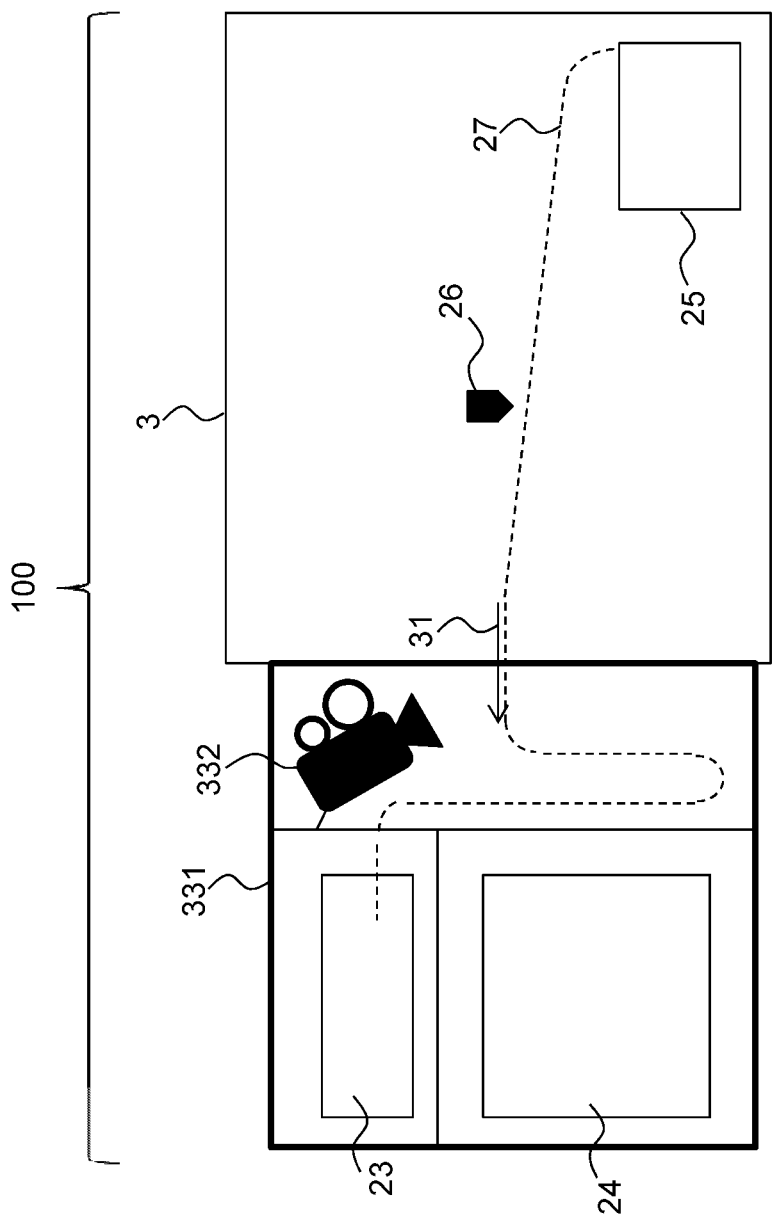
FIG. 3 shows a second example of a print system according to the invention.

FIG. 3 shows another embodiment according to the invention. A low-level integrated unit 332 is placed and resides inside the high-level integrated unit 331. The high-level integrated unit 331 is controlled by the control unit 18 (see FIG. 1) of the print system 100 by a high-level interface protocol. The characteristics of the high-level integrated unit 331 are known to the control unit of the print system 100. The low-level integrated unit 332 is not controlled by the high-level integrated unit 331. Only a status signal—an error or none error—of the low-level integrated unit 332 is arriving at the high-level integrated unit 331. The control unit 18 of the print system 100 is unaware of the low-level integrated unit 332.

The low-level integrated unit 332 may be a detection system, for example a camera system for inspecting sheets which are travelling from the print engine 3 through an outlet 31 to the high-level integrated unit 331. The camera system scans sheets which enter the high-level integrated unit 331. An algorithm is used, for example image processing software, to determine whether or not a sheet is correctly printed.

When the camera system detects a wrongly printed sheet, the high-level integrated unit 331 sends a huge earliest expected arrival time of the next sheet to be processed by the print engine to the control unit 18 (shown in FIG. 1) of the print system 100, and generates and sends a notification of a severe error to the control unit 18 in order to let the print engine 3 stop printing. The next sheet to be processed may be a first sheet, which has not yet been separated from the input tray 25 and is still residing in the input tray 25 of the print system 100.

The detection system may be a camera system, a weight system, an audio system, a light sensor, etc. The detection system triggers the high-level integrated unit 331 to send a huge earliest expected arrival time for the next sheet to the control unit of the print system 100. Also a notification leading to a print stop is submitted.

According to an alternative embodiment, the low-level integrated unit 332 is placed in-between the print engine 3 and the high-level integrated unit 331.

Figure 4:
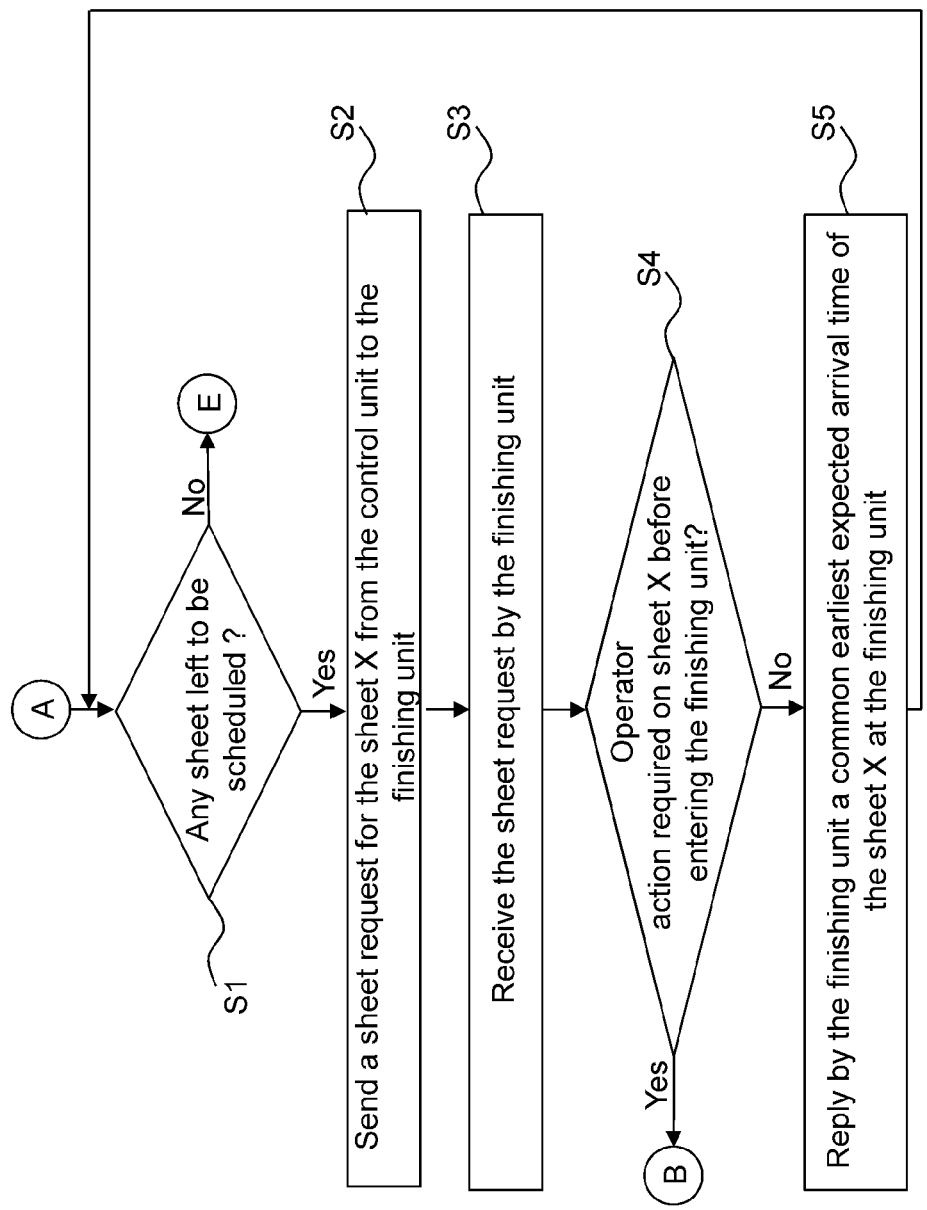
FIGS. 4 and 5 are a flow diagrams of the method according to the invention.
Figure 5:
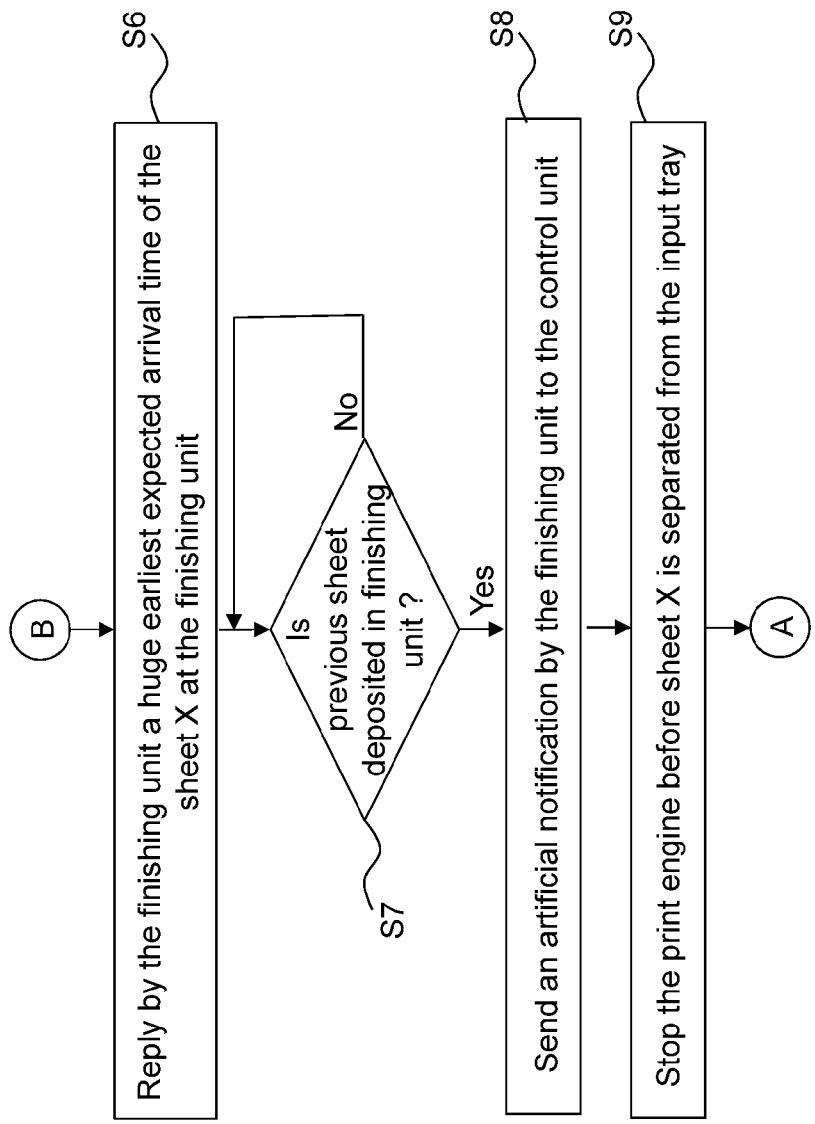

FIGS. 4 and 5 show a flow diagram of an embodiment of the method according to the invention.

The method starts in a starting point A in FIG. 4 and proceeds to a first step S1.

In the first step S1, it is checked if there is any sheet left to be scheduled for processing in the print system. If so, the method proceeds to a second step S2. If not, the method ends in an end point E.

In the second step S2, a sheet request for a sheet X left to be scheduled is sent from the control unit to the finishing unit.

In a third step S3, the sheet request for the sheet X is received by the finishing unit.

In a fourth step S4, it is checked if an operator action is required on the sheet X before the sheet X enters the finishing unit. An exception may be predicted or foreseen that will require an operator intervention. If so, the method proceeds via a mid-point B to a sixth step S6 (See FIG. 5). If not, the method proceeds to a fifth step S5.

In a fifth step S5, a regular earliest expected arrival time of the sheet X at the finishing unit is replied by the finishing unit. The earliest expected arrival time is a minimum delay time between the sheet X and the previous sheet X-1 preceding the sheet X. The method returns to the first step S1.

In a sixth step S6, shown in FIG. 5, an earliest expected arrival time of the sheet X at the finishing unit is replied by the finishing unit. The sheet X has not yet been separated from the input tray of the print system. The earliest expected arrival time is a minimum delay time between the sheet X and a previous sheet X-1 preceding the sheet X. However, contrary to the fifth step S5, the earliest expected arrival time for the sheet X is determined to be so huge that a gap in time between the sheet X and a previous sheet X-1, which is preceding the sheet X, is larger than a travel time of the previous sheet X-1 from the input tray to the finishing unit. The method proceeds to a seventh step S7.

In a seventh step S7, it is checked if the previous sheet X-1 has been deposited in the finishing unit. If so, the method proceeds to an eight step S8. If not, the method returns to the seventh step S7.

In the eighth step S8, a notification is submitted by the finishing unit to the control unit, after the previous sheet X-1 has been deposited in the finishing unit. The notification is reporting an error on sheet X to the print system. The reported error normally leads to a print engine stop.

In a ninth step S9, the print engine is stopped by the control unit before the sheet X is separated from the input tray. The method returns to the start point A in FIG. 4.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for stopping a print system from printing, the print system comprising a control unit for controlling the printing of sheets, a print engine for printing recording material on the sheets, an input tray for holding sheets to be printed upon, and a finishing unit, the method comprising the step of:
   scheduling a plurality of sheets for printing by the print engine and for finishing by the finishing unit, wherein the scheduling step comprises, for each sheet of the plurality of sheets:
   a) sending a sheet request for the sheet from the control unit to the finishing unit;
   b) upon receiving the sheet request, the finishing unit submitting to the control unit an earliest expected arrival time of the sheet at the finishing unit, which earliest expected arrival time is a minimum time delay between the sheet and a previous sheet preceding the sheet, wherein the minimum time delay is larger than a travel time of the previous sheet from the input tray to the finishing unit;
   c) submitting a notification by the finishing unit to the control unit, after the previous sheet has been deposited in the finishing unit, the notification comprising a stop request by reporting an error on the sheet to the print system; and
   d) stopping the print engine by the control unit before the particular sheet is separated from the input tray.

2. The method according to claim 1, wherein the previous sheet is a last scheduled sheet in a print queue buffer of the print engine.

3. The method according to claim 1, wherein the submitted earliest expected arrival time is a maximum time to be defined in the memory of the finishing unit.

4. The method according to claim 1, wherein the notification comprises a desired operator action and a location of the print system at which the desired operator action should be applied and the method further comprises the step of displaying the notification on a user interface of the print system.

5. The method according to claim 4, wherein the finishing unit comprises a detection module for detecting a need for the desired operator action.

6. The method according to claim 5, wherein the detection module is a camera system for detecting a stop request for the sheets to be separated from the input tray.

7. The method according to claim 5, wherein the detection module is part of a local user interface of the finishing unit which is configured to receive a finishing unit user request.

8. The method according to claim 1, wherein the error is a paper jam caused by the particular sheet.

9. A print system comprising:
   a control unit for controlling the printing of sheets;
   a print engine for printing recording material on the sheets;
   an input tray for holding sheets to be printed upon; and
   a finishing unit,
   wherein the control unit is configured to execute the steps a) and d) of the method according to claim 1 and the finishing unit is configured to execute the steps b) and c) of the method according to claim 1.

10. The print system according to claim 9, wherein the finishing unit comprises a high-level integrated unit connected to the control unit of the print system, and a low-level integrated unit connected to the high-level integrated unit, and
   wherein the control unit of the print system controls the high-level integrated unit and the high-level integrated unit is configured to receive signals from the low-level integrated unit in case of an error on a sheet of the plurality of sheets, which error is detected by the low-level integrated unit.

11. The print system according to claim 9, wherein the finishing unit comprises a high-level integrated unit connected to the control unit of the print system, and a low-level integrated unit connected to the high-level integrated unit, and
   wherein the control unit of the print system controls the high-level integrated unit and the high-level integrated unit is configured to predict a future error in the low-level integrated unit by the print specifications of the plurality of sheets.

12. A non-transitory computer readable medium comprising computer executable program code configured to instruct a computer to perform the method according to claim 1.

* * * * *